Feb. 28, 1961

E. A. ROCKWELL 2,972,902

POWER BOOSTER MECHANISM

Filed May 1, 1958

INVENTOR
EDWARD A. ROCKWELL
BY
Carlson, Pitzner, Hubbard & Wolfe
ATTORNEYS

Feb. 28, 1961 E. A. ROCKWELL 2,972,902
POWER BOOSTER MECHANISM
Filed May 1, 1958 3 Sheets-Sheet 2
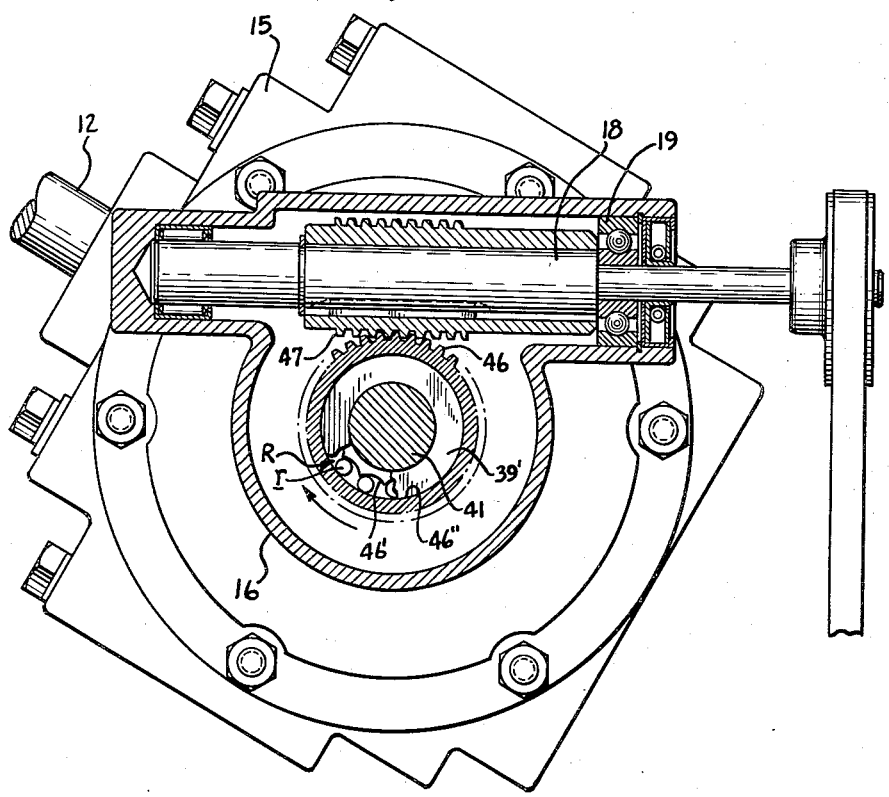
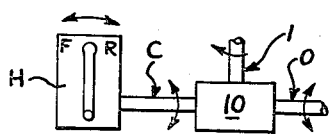
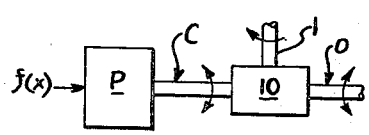
INVENTOR.
EDWARD A. ROCKWELL Feb. 28, 1961  E. A. ROCKWELL  2,972,902
POWER BOOSTER MECHANISM
Filed May 1, 1958  3 Sheets-Sheet 3

INVENTOR
EDWARD A. ROCKWELL
by: Carlson, Pitzner, Hubbard & Wolfe
ATTYS

United States Patent Office 2,972,902
Patented Feb. 28, 1961

2,972,902
POWER BOOSTER MECHANISM
Edward A. Rockwell, 167 Ashdale Place,
Los Angeles, Calif.
Filed May 1, 1958, Ser. No. 732,235
8 Claims. (Cl. 74—388)

This invention relates in general to a mechanical unit for the transmission of power, and more specifically to a mechanism particularly adapted for use in operating automotive accessories such as automobile steering gears, brakes, etc.

It is a principal object of this invention to provide an improved mechanical power transmission which is instantaneously responsive to the motion of a control member. A more specific object is to provide a transmission having a follow-through connection which transmits motion from the control member directly to the driven device, and wherein the power supplied by the transmission is regulated by the control member. When used for power assist in an automobile steering system, for instance, it is a main object of this invention to provide for more precise and safer steering by reason of the direct manual control over the steering gear operation and the operator "feel" which is always present in the system. In certain respects this invention is an improvement over my Patent No. 2,564,281, which relates to a power unit especially adapted for use in operating automotive accessories.

A related object of this invention is to improve the safety of automobile steering systems by insuring against loss of steering control under conditions of power failure.

Another important object of this invention is to provide a power unit for use in an automobile steering system which derives power from a rotating member, such as the automobile engine, and applies it to the steering gear along with a smaller, fixed, proportion of direct manual effort. A related object is to provide for dividing the manual force applied to the steering wheel, and applying one portion to the steering gear directly through the follow-through connection of the power booster, and the remaining portion to operate the booster for deriving power to supplement the directly applied force and operate the steering gear.

It is another object of the present invention to provide a power unit which is extremely compact and which is capable of being mounted on the steering column in an accessible location facilitating adjustment and maintenance.

A further object is to provide a power unit which is quiet in operation due to a reduction in undesirable noise due to speed ratio changes, chattering, etc.

Other objects and advantages of the invention will become apparent upon reading the attached description and upon reference to the drawings, wherein:

Fig. 2 is a transverse sectional view of the unit taken in the plane of lines 2—2 of Figure 1;

Figure 1:
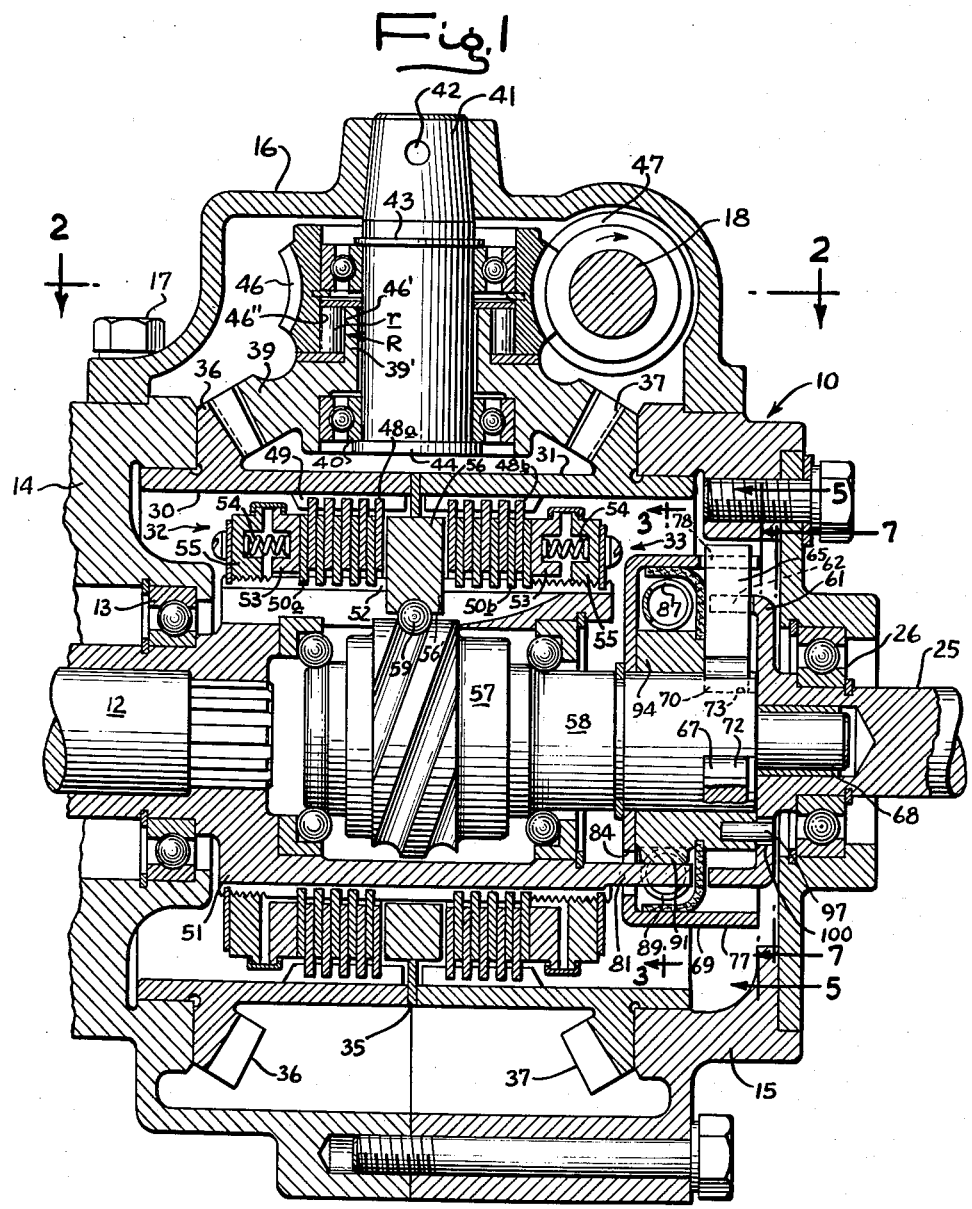
Figure 1 is a longitudinal cross-sectional view of a power transmission unit embodying the invention.
Figure 7:
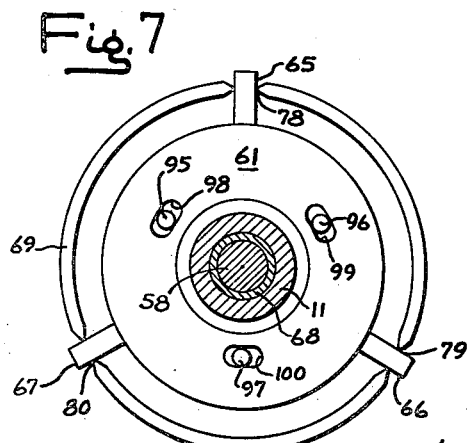
Figure 8:
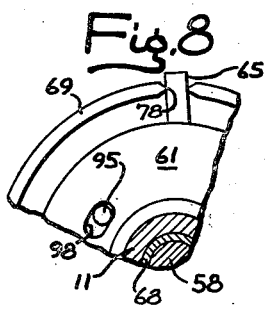

Figs. 7 and 8 are stop motion views showing the power "off" and power "on" positions, respectively, of the transmission elements, and are taken substantially in the plane of lines 7—7 of Figure 1; and Figs. 9 and 10 are diagrammatic views illustrating different systems including the transmission.

While the invention is susceptible of various modifications and alternative constructions, certain illustrative embodiments have been shown in the drawings and will be described below in considerable detail. It should be understood, however, that there is no intention to limit the invention to the specific forms disclosed, but on the contrary, the intention is to cover all modifications, alternative constructions and equivalents falling within the spirit and scope of the invention as expressed in the appended claims.

Referring to Fig. 9, for purposes of explanation the invention is illustrated diagrammatically in a power transmission system of general utility, which system is operative to transmit power between an input shaft I and an output shaft O, and provides forward and reverse drive by appropriate movement of the selector handle H. Under this arrangement, it is contemplated that the direction of rotation of the control shaft C, which may be continuously rotating, is determined by moving the selector handle H toward F or R, respectively, from the neutral position (as shown).

It is also contemplated that a transmission unit 10 constructed in accord with the invention may be controlled automatically and by power operated means, as in Fig. 10. In this figure the control motion applied to the control shaft C of the power unit 10 is obtained from a mechanism such as a differential gear system P which is operated in accordance with some variable function $f(x)$. In the latter arrangement the control shaft C is driven continuously in either the forward or reverse direction, and the system P may be so constructed that the control shaft C and likewise the output shaft O of the power unit 10 is driven in one direction or the other, depending upon the variation of the function $f(x)$ from a predetermined value.

While the invention has general utility, therefore, it also has specific utility as a power unit mechanism for supplying power assist in an automotive steering system. For illustrative purposes the transmission or power unit has been shown in such an arrangement in Figs. 1–8, and referring to these figures for the following detailed description, it will be seen that the power unit 10 is employed to augment manual effort applied by means of the steering wheel, and for this purpose is rigidly connected by means of its output shaft to the steering gear worm shaft 12, these shafts being carried within a ball bearing 13 mounted in the tubular housing portion 14 which in the present case constitutes the steering gear housing. The power unit or booster 10 is contained within its housing 15 which is secured to the steering gear housing 14. At one side the power unit housing 15 is provided with a gear casing 16 held in place by cap screws 17 for receiving a power driven input shaft 18 supported by bearings 19 in the gear casing and having an outer end adapted to be driven by the automobile engine, for example, by a pulley and belt drive 20 as shown in Fig. 2. From this latter figure (in which the shaft 18 is positioned 60° from the position in which it is shown in Figure 1) it will be noted that the gear casing 16 may be indexed about the axis of the shaft 41, and by relocating the bolt holes or by using a gear casing having bolt holes located angularly displaced from the positions shown in Fig. 2, the angular relation of the shaft 18 may be adjusted to accommodate different steering post angles.

Connected to the power unit 10 to operate the same and in longitudinal alinement with the steering gear worm shaft 12 is the control shaft, which in the present case comprises the steering shaft 25. The steering shaft 25 may be journaled in a bearing 26 in the power unit housing 15.

In the present arrangement, by a connection through the power unit, manual force is applied from the steering shaft 25 directly to the steering gear worm shaft 12 which manual force is augmented by power derived by means of the power unit 10 from the input shaft 18 driven by the automobile engine.

The power unit

In the present instance, referring to Figure 1, the power unit 10 is seen to include a hub made up of a pair of oppositely rotating sections 30, 31 from which force is derived by multiple disc couplings 32, 33 for application to the steering gear worm shaft 12. The hub sections 30, 31 are journaled within the power unit housing 15, spaced by a bushing 35, and carry ring gears 36, 37 on the outside thereof. The rotating hub sections 30, 31 are driven in opposite directions respectively, by the input shaft 18, in order to provide force for turning the steering gear worm shaft 12 in opposite rotary directions, for actuating the steering linkage to turn the vehicle wheels in right turn or left turn direction.

The ring gears 36, 37 carried on the outside of the hub sections 30, 31 are in the form of bevel gears meshing on opposite sides of a power driven bevel pinion 39. This pinion 39 is carried by means of a bearing 40 on the stud 41 which is held in place in the gear casing 16 by a pin 42. The shoulder 44 positions the bearing 40 on the stud 41 and engages the inner race of the bearing. The power driven pinion 39 is connected by an over-running clutch R to a worm wheel 46 which meshes with a worm 47 on the input shaft 18. This over-running clutch R includes camming grooves 46' fashioned in a tubular section 39' of the bevel gear 39 and containing rollers r which are drivingly engaged by the inner cylindrical surface 46" of the worm wheel 46. Upon rotation of the worm wheel 46 in the positive drive direction as indicated by the arrow in Fig. 2, the rollers r are urged into the shallow portions of the camming grooves 46' where they drive the worm wheel 46. When an over-running condition occurs, as upon a failure of power, the rollers r fall into the deep portions of the grooves 46' thus releasing the power unit from the engine drive.

With this arrangement, a speed reduction is obtained between the input shaft 18 and the power driven pinion 39 by means of the worm drive. A further speed reduction is effected between the bevel pinion 39 and the ring gears 30, 31 of the power unit, providing a smoothly operating and silent speed reduction gear train for the power unit. It is contemplated that the input shaft 18 may be driven clockwise as depicted in Figure 1, producing clockwise rotation of the lower ring gear 36 and counter-clockwise rotation of the other ring gear 37.

Each multiple disc coupling consists of five friction-faced drive discs 48a, b having external teeth fitting on inside splines 49 within the rotating hub sections 30, 31, and five driven discs 50a, b. The driven discs 50 are utilized to transmit force produced when the discs of the assembly are engaged to turn an output sleeve 51 fastened at one end of the steering gear worm shaft 12. Herein the driven discs 50 are mounted on the sleeve 51 by means of splines 52. To obtain smooth operation, and as a means of defining a limit on the force producible by the power unit, the discs of each multiple disc coupling 32, 33 are supported at the outer end thereof by a ring 53 slidable on the outside of the sleeve 51 and carrying a series of helical power limit springs 54 in pockets therein. These springs are received within similar pockets in a ring 55 screw-threaded to the sleeve 51. Engaging the multiple disc-couplings 32, 33 is accomplished by means of an annular presser plate 56 mounted between the assemblies so as to be movable in one direction or the other axially of the housing 15, and having internal lugs 56' extending through slots in the sleeve. For example, to turn the steering gear worm shaft 12 clockwise, in order to turn the vehicle wheels to make a right turn, the said presser plate 56 is moved toward the left as viewed in Figure 1 by turning a threaded bushing 57 carried for rotation with a steering shaft extension 58 mounted centrally of the unit 10, and cooperating with a ball 59 seated in a groove in the internal lugs 56' carried by the annular presser plate.

Manual and power proportioning

In accordance with the present invention, the power unit includes a direct connection between the input shaft and the output shaft so that a portion of the control force is applied directly to the output shaft. When employed to produce power assist for a steering mechanism, this permits direct and exceedingly precise control over the operation of the steering gear. In addition, with this arrangement a proportioning mechanism provides means for dividing the manual effort applied by the driver to the steering shaft into a fixed proportion, applying one portion directly to the steering gear worm shaft through the follow-through connection, and applying the remaining portion to operate the power unit so as to derive power from the automobile engine and apply the said power to augment the manual force for turning the steering gear.

In the present instance, the lower end of the steering shaft 25 has an annular flange 61 which is provided with three equally spaced slots 62–64 for cooperation with three proportioning levers 65–67 pivotally supported on the extension shaft 58. The latter is journaled within a bushing 68 also in the lower end of the steering shaft. These proportioning levers 65–67 are connected at their free ends to the steering gear worm shaft via a connecting member 69 and the booster sleeve 51. These proportioning levers 65–67 are also connected to operate the power unit by means of the extension shaft 58, and threaded bushing 57. By means of the foregoing proportioning levers 65–67, a division of manual force as supplied by the steering shaft 25 is effected, and the manual force is applied both to operate the steering gear worm shaft 12 directly and to operate the power unit 10. For this purpose, each proportioning lever 65–67 is provided with an inner cylindrical end 70–72 received in semi-cylindrical pockets 73–75 in the extension shaft 58 so that the levers are pivotable together thereon and are each of the second class, producing approximately equal forces at the free ends and at the pivot.

For transmitting manual force to the steering gear worm shaft 12, the sleeve 51 is employed which sleeve is splined on the steering gear worm shaft. For connecting the proportioning levers 65–67 to the sleeve the connecting member 69 rotatably supported on the extension shaft is employed, said member having a peripheral rim 77 with slots 78–80 in which the outer ends of the proportioning levers are disposed for imparting rotary movement thereto. Lugs 81–83 extending axially from the end of the sleeve 51 fit in slots 84–86 in the radial wall of the connecting member 69, so that rotary movement of the same, due to pivotal movement of the proportioning levers, after the slack has been taken up results in a direct mechanical connection from the proportioning levers to the worm shaft 12 and causes rotation of the latter.

Pivotal movement of the proportioning levers 65–67 resulting from the application of manual force thereto by movement of the steering shaft 25 operates the power unit 10 by producing rotation of the extension shaft 58 and threaded bushing 57 carried thereby, to engage the appropriate multiple disc assembly 32, 33, depending on the direction of rotation of the steering shaft. The spacing of the points of connection between the flange 61 on the end of the steering shaft, the proportioning levers 65–67, and the connecting member 69; and the lengths of the levers, determines the proportioning of the force applied to the sleeve 51 and thus the steering gear directly, and to the extension shaft 58 to operate the power unit.

Figure 3:
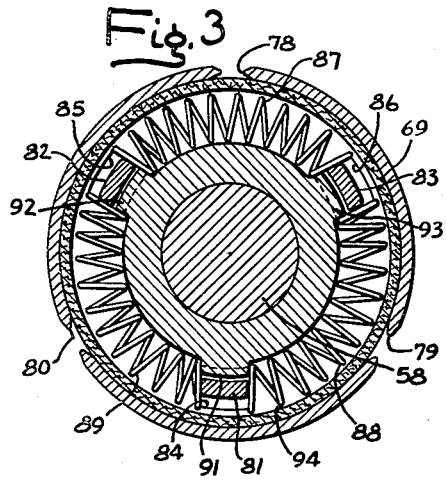
Figs. 3 and 4 are stop motion views showing the power "off" and power "on" positions, respectively, of the transmission elements, and are taken substantially in the plane of lines 3—3 of Figure 1.
Figure 4:
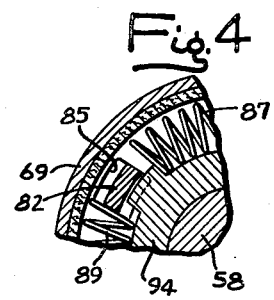
Figure 5:
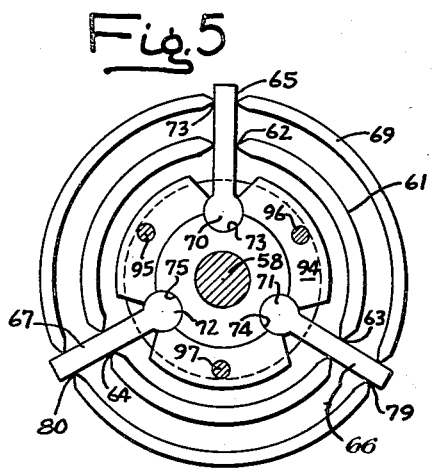
Figs. 5 and 6 are stop motion views showing the power "off" and power "on" positions, respectively, of the transmission elements, and are taken substantially in the plane of lines 5—5 of Figure 1.
Figure 6:
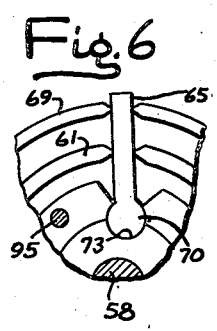

Referring to Figures 1 and 3–8, when the steering shaft 25 is turned in the manner just described, the extension shaft 58 is advanced relative to the sleeve 51 in order to engage one of the multiple disc couplings 32, 33, and this movement of the extension shaft is utilized to compress a series of three return springs 87–89. In this case the lugs 81–83 on the end of the booster sleeve contact the outer half of the ends of the return springs. The inner half of the ends of the return springs 87–89 abut radial lugs 91–93 carried by a sleeve 94 connected to the extension shaft. As shown in Figs. 3 and 5 the sleeve 94 is connected to the extension shaft by means of the cylindrical inner ends 70–72 of the proportioning levers 65–67. The return springs 87–89 when compressed as shown in Fig. 4, due to the relative advance of the extension shaft, exert a return torque between the sleeve 94 and extension shaft 58, biasing the same toward the neutral position which is shown in Fig. 5.

In the operation of the invention, for example to turn the wheels to make a right turn, the steering shaft 25 is turned clockwise rotating the flange 61 on the end of the shaft and applying force to the proportioning levers 65–67 at an intermediate point on the levers. The said levers 65–67 are thus caused to pivot from the nuetral position of Figs. 5 and 7 to the position shown in Figs. 6 and 8, effecting engagement of the friction disc coupling 32, as an incident to this pivotal movement. The foregoing is accomplished, as will be noted from Figure 1, due to the advancing of the extension shaft 58 and the worm carried thereby angularly relative to the sleeve 51, which rotary advance causes engagement of the friction discs 48a, 50a of the coupling 32 by the axial movement of the presser plate 56 produced by the rotary movement of the worm. This may be further explained by reference to Figs. 3–8 which show that as the connecting member 69 turns clockwise, the edges of the slots 84–86 are in engagement with the lugs 81–83 on the end of the sleeve 51 as seen in Figs. 3 and 4, and such rotation of the slots causes rotation of the sleeve 51. Rotation of the steering shaft via the proportioning levers 65–67 which pivot to the positions of Figs. 6 and 8 imparts force to turn the extension shaft 58 by reason of the force exerted by the levers at their pivot. In carrying out the foregoing, motion of the free ends of the levers is opposed by the resistance to turning offered by the vehicle wheels, which causes a reaction on the outer ends of the proportioning levers at the point of connection to the connecting member 69. This is the operating condition of the mechanism and produces engagement of the appropriate friction disc coupling 32 to apply power to the sleeve 51. Continued application of force to the proportioning levers 65–67, as by continued rotation of the steering shaft, produces rotary movement of the proportioning mechanism, including the levers 65–67 positioned substantially at the angle depicted in Figs. 6 and 8, as a unit about the axis of the shaft 25 and the power driven hub. During this operating condition, the proportioning levers are effective to apply manual force directly to the steering gear worm shaft 12 via the connecting member 69 and the slots 84–86 therein, which engage the lugs 91–93 on the sleeve.

Continued clockwise rotary movement of the steering shaft produces rotary movement of the proportioning mechanism about the axis of the hub, and manual force is applied directly to the output sleeve 51. Since such clockwise movement also forces the actuating plate downward to engage the discs of the lower disc coupling 32, the hub section 30 associated with the aforesaid lower disc assembly 32 is connected by the engaged discs to the sleeve 51 to turn it and the steering gear worm shaft 12 in the same direction.

When the steering wheel is stopped and the application of further manual force to the proportioning mechanism is discontinued, thereupon the extension shaft 58 is returned by the return springs 87–89 to the original angular relationship or neutral position relative to the sleeve 51. This return movement of the extension shaft 58 results in axial movement to the right (Figure 1) of the annular presser plate 56, disengaging the coupling 32, and automatically discontinuing the power application to the output sleeve 51.

In the event of power failure, the steering gear is operated directly by the steering shaft, via the pivotally mounted proportioning levers 65–67. Since one of the disc assemblies 32, 33 is engaged, however, the motion of the steering shaft is transmitted to also turn the corresponding ring gear 36, 37 and the bevel pinion 39 in the reverse direction to which it normally turns when power driven.

The overrunning clutch R is interposed between the bevel pinion 39 and the worm drive (46, 47), and thus between the steering shaft and the worm drive, so that the steering shaft will be automatically disconnected from the input shaft in the event of such failure of power and manual turning of the steering shaft. Unless provision is made to disconnect the worm drive, when the manual force over-rides the power and the worm wheel 46 is driven in the reverse direction, the latter may jam against the worm 47. The irreversibility of worm drives at certain angles is well known. In the present case by providing the overrunning clutch R, which releases instantaneously upon reverse rotation of the shaft 41, the steering shaft encounters no resistance to turning due to jamming of the worm drive, and other than the friction present in the mechanism.

It is an important feature of the invention, due to the incorporation of the direct connection between the input and output that has just been described, that the power unit operates with increased stability giving smoother operation. As has been previously described, the proportioning arrangement which affords the direct connection operates so that a portion of the controlling force is applied directly on the output member. When the output member is loaded and resists this force, the power control elements (the pivotal levers 65–67 in the present case) pivot to engage the clutch discs of the disc assemblies 32, 33 and drive the output member. In other words, the reaction when the output member is loaded causes the power to be derived and impressed to augment the manual effort. This reaction against the load assures that the unit will not vibrate on and off, and will operate smoother. This is a conevnient point to emphasize that the invention provides a variable gear for use where it is desired to transmit relatively light loads and where it is important to have instantaneous and precise response to the motion of a control member. The power unit of the invention provides such features. Accordingly, the invention has considerable utility in control systems other than vehicle steering systems. For example, the invention may be used in an automatic control system for a machine such as a machine tool.

As will be readily apparent, the power units 10 might be connected in series, and the output shaft of one unit connected to the control shaft of the succeeding unit, so that at the final low speed there would be a substantial increase in the torque. While power loss as the unit 10 operates may be substantial due to slippage, when precise response is the primary requirement loss of power may not be an important factor.

In Fig. 9, showing use of the power unit 10 in a system having general utility, the selector handle H is used merely to determine the direction of rotation of the control shaft C, and is substituted for the steering shaft of the arrangement described previously. It is noted that in the general case, in Fig. 9, there would be no "feel" of the operation of the output of the power unit, as there is when the unit 10 is connected as in Figs. 1–8 to operate a steering gear. The unit 10 in the general case is employed to boost or augment the power applied to the control shaft C. It comprises a variable gear, relatively inexpensive to manufacture, and light in weight.

Since with the power unit 10, the direction of rotation of the output shaft is determined by the direction in which the control shaft is rotated, where the control shaft 25 is, for example, to be operated in accordance with a variable function $f(x)$ supplied to the system, the arrangement may be such that values of the function having a positive sign produce clockwise rotation of the control shaft and likewise the output shaft, while negative values of the function produce rotation in the reverse direction. The controls for a machine may be connected to the output shaft of the power unit 10 and the machine automatically operated in this manner.

Turning now to additional features of the invention which are particularly important when the power unit is employed in an automotive steering system, in accordance with the invention the power obtainable from the power unit 10 is limited to prevent damage to the mechanism as, for example, when the wheels are cramped against the curb. In the present instance, the foregoing result is achieved by limiting the back-up pressure on the discs through the agency of the power limit springs 54, and by limiting the permissible extent of pivotal movement of the proportioning levers and thus the force applied to the couplings to engage the same. The latter is accomplished by connecting the flange 61 on the lower end of the steering shaft, with the sleeve 94 on the extension shaft by a pin and slot connection including pins 95–97 mounted on the sleeve 94 received in slots 98–100 cut in the flange 61. As shown in Figs. 7 and 8, by means of the slot and pin connection just described, the extent to which the proportioning levers 65–67 may be pivoted angularly is determined when the pins 95–97 engage the ends of the slots 98–100 in the flange 61. The application of additional manual force over that required to produce movement of the proportioning levers 65–67 to the power limit position results in the transmittal of that additional force directly to the sleeve 51 through the proportioning levers and connecting member 69, without a corresponding advance of the extension shaft 58 and increase in the power applied by the unit 10 due to a further engagement of the coupling 32. This is felt by the driver as a sudden increase in resistance to turning the steering shaft 25, and the lever lengths and turning ratios provided in the system and steering linkage are such that damage to the system is effectively prevented.

The operation of a power unit or booster 10 embodying the invention has been described in connection with an automotive vehicle steering system. It will be understood that for general application, the power unit 10 may be connected so that what has been described as the steering gear worm shaft 12 constitutes the output shaft, and the latter may be driven by power derived from a source driving the shaft 18 which may be considered the input shaft. In such an arrangement what has been described as the steering shaft 25 constitutes the control shaft, and may be operated manually or automatically as illustrated diagrammatically in Figs. 9 and 10.

I claim as my invention:

1. In a power actuating mechanism having a rotatable hub, the combination comprising, an output member mounted for rotary movement, an energizing device movably mounted on said hub and connected to said output member so that movement of the energizing device produces movement of the output member, said energizing device including a rotatable coupling driven by said hub and engageable to connect said hub and said output member while the hub is rotating, an actuating member for the mechanism, means for engaging said coupling including an element mounted for movement relative to said actuating member, and proportioning means between said actuating member and said energizing device, said proportioning means including a rigid connection both to said engaging means element and to said output member from said actuating member for dividing force received from the actuating member into a fixed proportion and applying one portion so as to move said energizing device and thus the output member directly, and another portion to said engaging means element for operating said energizing device and engaging said coupling so as to derive power from the hub while rotating for moving said energizing device and thus the output member for boosting the direct effort applied to the output member.

2. In a power actuating mechanism having a rotatable hub, the combination comprising, an output member mounted for rotary movement, an energizing device movably mounted on said hub and connected to said output member so that movement of the energizing device produces movement of the output member, said energizing device including a rotatable coupling driven by said hub and engageable to connect said hub and said output member while the hub is rotating, a manually operated actuating member for the mechanism, and proportioning means between said manually operated actuating member and said energizing device for dividing manual force received from said manually operated actuating member into a fixed proportion, said proportioning means including a pivotal lever having a connection at one point to said coupling for engaging the same as an incident to pivotal movement of said lever, said lever having a connection at another point to said manually operated actuating member, and a connection at another point to said output member, said manually operated connections being so arranged that force applied to said lever in one direction by said actuating member is effective both to pivot the lever and as an incident to the pivotal movement, to move said manually operated output member directly by manual effort and to operate said energizing device and engage said coupling so as to derive power from the hub while rotating, the length of the lever and the spacing of the points of connection determining the proportioning of the force applied to the output member as between (a) that derived from the hub and (b) that derived from said manually operated actuating member.

3. In a power actuating mechanism having a rotatable hub, the combination comprising, an output member mounted for rotary movement, said hub and said output member being mounted concentrically, an energizing device movably mounted on said hub and connected to said output member so that movement of the energizing device produces movement of the output member, said energizing device being movably mounted on said hub and connected to said output member so that movement of the energizing device produces movement of the output member, said energizing device including a rotatable coupling driven by said hub and mounted between said hub and said output member so as to connect the same, a coupling operating member rotatably mounted on the axis of said hub and effective upon rotary movement to engage said coupling, a manually operated actuating member for the mechanism, and proportioning means between said manually operated actuating member and said energizing device for dividing manual force received from said manually operated actuating member into a fixed proportion, said proportioning means including a lever having a pivotable connection at one end to said coupling operating member and being pivotable radially about its pivot, said lever having a connection at the distal end to said output member, and at a medial point to said actuating member, said connections being so arranged that force applied to said lever at the said medial point is effective both to pivot the same and to drive said output member directly by manual effort and to impart force at its pivot to rotate said coupling operating member so as to engage said rotatable coupling and derive power from the hub, the length of the lever and the spacing of the points of connection determining the proportioning of the force applied to the output member as between (a) that derived from the hub and (b) that derived from said manually operated actuating member.

4. In a power actuating mechanism having a rotatable hub, the combination comprising, an output member mounted for rotary movement, an energizing device movably mounted on said hub and connected to said output member so that movement of the energizing device produces movement of the output member, an actuating member for the mechanism, said energizing device including a rotatable coupling driven by said hub and engageable to connect said hub and said output member, a coupling operating member movable angularly relative to said actuating member from a neutral position and effective as an incident to such angular movement to engage the coupling, and return means connected to said coupling operating member and mounted to resist such angular movement, said coupling being effective for rotating said output member upon engagement while the hub is rotating, and proportioning means between said actuating member and said energizing device for dividing force received from the actuating member into a fixed proportion, and applying one portion so as to move said energizing device and thus the output member directly, and another portion for moving said coupling operating member angularly against the resistance of said return means, so as to engage said coupling to derive power from the hub while rotating for moving said energizing device and thus the output member for boosting the force applied to the output member, said return means being effective to return said coupling operating member to the neutral position when the actuating force is withdrawn.

5. In a power actuating mechanism having a rotatable hub, the combination comprising, an output member mounted for rotary movement; an energizing device movably mounted on said hub and connected to said output member so that movement of the energizing device produces movement of the output member; an actuating member for the mechanism; said energizing device including a rotatable coupling driven by said hub and engageable to connect said hub and said output member, a coupling operating member yieldably mounted for movement relative to said actuating member from a neutral position and effective as an incident to such movement to engage the coupling, and a connection between said actuating member and said coupling operating member limiting the extent of relative movement; and proportioning means between said actuating member and said energizing device for dividing force received from the actuating member into a fixed proportion and applying one portion so as to move said energizing device and thus the output member directly, and another portion for moving said coupling operating member relative to the actuating member, so as to engage said coupling to derive power from the hub while rotating for moving said energizing device and thus the output member for boosting the force applied to the output member; said connection being effective for limiting the power derived from the hub by limiting the extent of engagement of said coupling.

6. In a power actuating mechanism having a rotatable hub, the combination comprising: a movable output member mounted coaxially of said hub; an energizing device movably mounted on said hub and connected to said output member so that movement of the energizing device produces movement of the output member, said energizing device including a friction disc coupling mounted coaxially of said hub and having discs driven by said hub and discs rotatable with said output member, said discs being movable longitudinally of the hub into engagement to connect said hub and said output member for rotating the latter, and a coupling operating member yieldingly mounted for movement about the axis of the hub from a neutral position and connected to apply force to said discs to move the same longitudinally into engagement as an incident to such movement from the neutral position; a manually operated actuating member for the mechanism; and proportioning means between said actuating member and said energizing device for dividing manual force received from the actuating member into a fixed proportion and applying one portion so as to move said energizing device and thus the output member directly by manual effort, and another portion for operating said energizing device and engaging said coupling so as to derive power from the hub while rotating for moving said energizing device and thus the output member for boosting the manual effort applied to the output member, said proportioning means including a connection between said actuating member and said coupling operating member limiting the movement of the latter from the neutral position, said connection being effective for limiting the power derived from said hub by limiting the engaging force applied to said friction discs.

7. In a power booster for an automobile steering system having a steering shaft and a steering gear, the combination comprising an output member, reversible worm actuator elements, one of which is on a rotatable shaft, a work-performing clutch assembly connected to said output member and having a clutch actuator plate carrying the other of said worm elements and movable by said worm elements longitudinally of said shaft between two oppositely acting sets of drive and driven clutch discs, means coupling said steering shaft to said worm actuator elements and output member for applying manual force for operating said clutch assembly and directly to said output member, a plurality of oppositely driven ring gears geared, respectively, to the two sets of drive discs, an irreversible power driven gear drive, and clutch means connecting said gear drive to said ring gears for supplying power to the latter and for disconnecting the gear drive responsive to reverse torque upon failure of power.

8. In a power actuating mechanism having a rotatable hub, the combination comprising, an output member mounted for rotary movement, an energizing device movably mounted on said hub and connected to said output member so that movement of the energizing device produces movement of the output member, said energizing device including a rotatable coupling driven by said hub and engageable to connect said hub and said output member, said coupling being effective for rotating said output member upon engagement while the hub is rotating, an actuating member for the mechanism, means for engaging said coupling including an element mounted for movement relative to said actuating member, and proportioning means between said actuating member and said energizing device, said proportioning means including a rigid connection both to said engaging means element and to said output member from said actuating member for dividing force received from the actuating member into a fixed proportion and applying one portion so as to move said energizing device and thus the output member directly, and another portion to said engaging means element for operating said energizing device and engaging said coupling so as to derive power from the hub while rotating for moving said energizing device and thus the output member for boosting the direct effort applied to the output member.

References Cited in the file of this patent

UNITED STATES PATENTS

| | | |
|---|---|---|
| 2,667,232 | Woolley | Jan. 26, 1954 |
| 2,736,208 | Lincoln | Feb. 28, 1956 |
| 2,775,133 | Armantrout | Dec. 25, 1956 |
| 2,817,246 | Jencick | Dec. 24, 1957 |
| 2,833,154 | Barnes et al. | May 6, 1958 |